*J. P. Buckland,*
*Coal Screen.*

N°26,474. Patented Dec. 20, 1859.

UNITED STATES PATENT OFFICE.

JOSEPH P. BUCKLAND, OF CHICOPEE FALLS, MASSACHUSETTS.

COAL-SIFTER.

Specification of Letters Patent No. 26,474, dated December 20, 1859.

*To all whom it may concern:*

Be it known that I, JOSEPH P. BUCKLAND, of Chicopee Falls, in the county of Hampden and State of Massachusetts, have invented a new and useful improvement on sifters for separating coal from ashes, in which the sieve is made to tip or take an inclined or slanting position and is provided with a movable tailpiece or gate so arranged that the tipping or slanting of the sieve causes the opening of the end or side of the sieve for the free passage of the coal or other substance sifted; and I do hereby declare that the same is fully described and represented in the following specification and the accompanying drawings, letters, figures, and references thereof.

Figure 1:
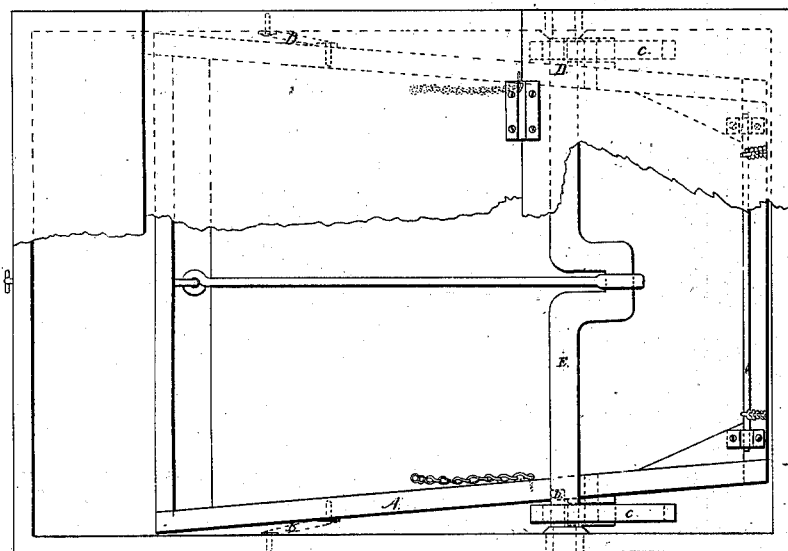
Figure 2:
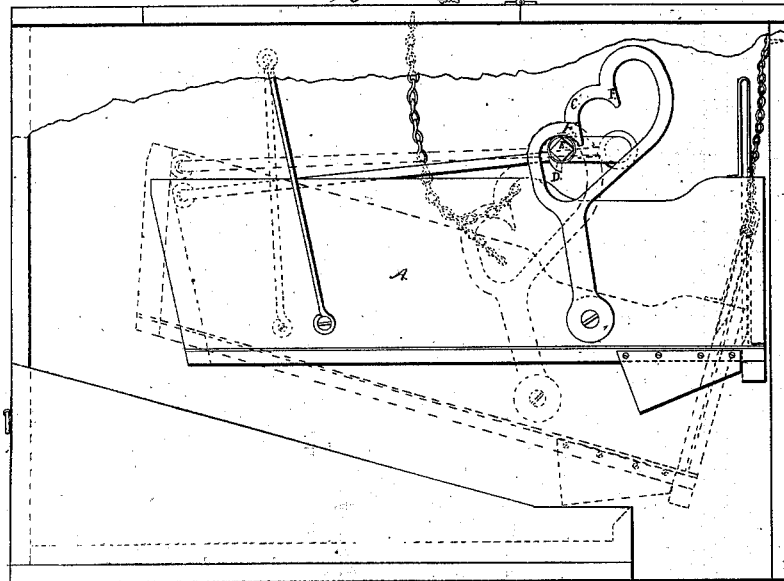

Figure 1, is a plan and Fig. 2 a side elevation of said sifting machine with part of the casing or box removed.

Similar letters refer to like parts.

A, is the sieve hung at one side by the connecting bars B, B, and at the other side by the scrolls C, C, which are so connected with the cams D, D, on the crank-shaft E, that when the motion of said shaft is reversed the cams D, D, throw off the scrolls from the lower notches by coming in contact with the points F, F, thus dropping one side or end of the sieve as shown by the red lines and at the same time causing the opening of the end for the free passage of the coal or other substance sifted.

I do not claim the mechanism by means of which the ordinary reciprocal motion is communicated to the sieve, as that is a device in common use for the purpose; but What I do claim and desire to secure by Letters Patent is—

1. A dumping or tipping sieve provided with a movable tail-piece or gate so arranged that the tipping or slanting of the sieve causes the opening of the end or side of the same for the free passage of the coal or other substance sifted.

2. A combination of the scrolls C, C, and cams D, D, with the sieve A when arranged and operating substantially in the manner and for the purpose as herein described.

JOSEPH P. BUCKLAND.

Witnesses:
M. D. WHITAKER,
CHAS. S. HARRIS.